July 26, 1949.　　　　T. H. BRADLEY　　　　2,477,168
FISH EVISCERATING APPARATUS
Filed March 12, 1945　　　　　　　　　　　　3 Sheets-Sheet 1
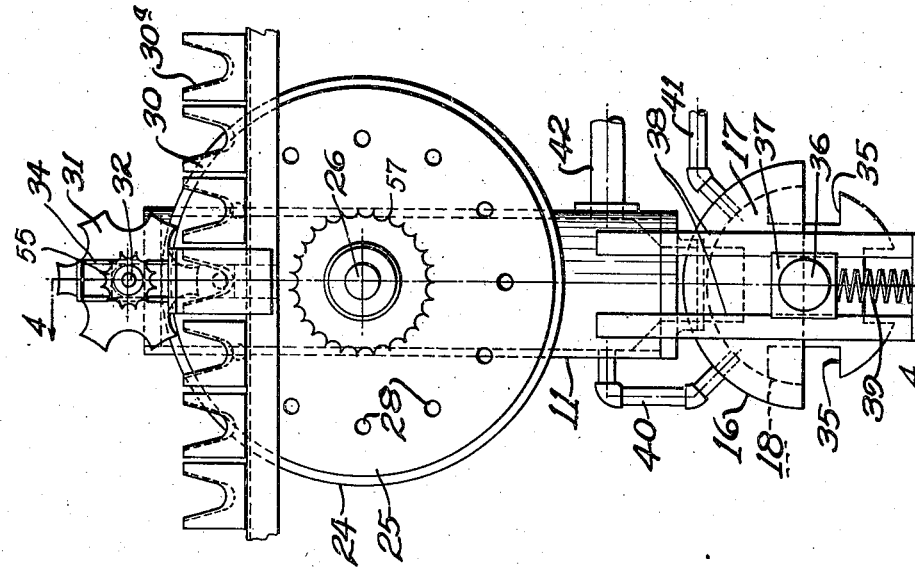
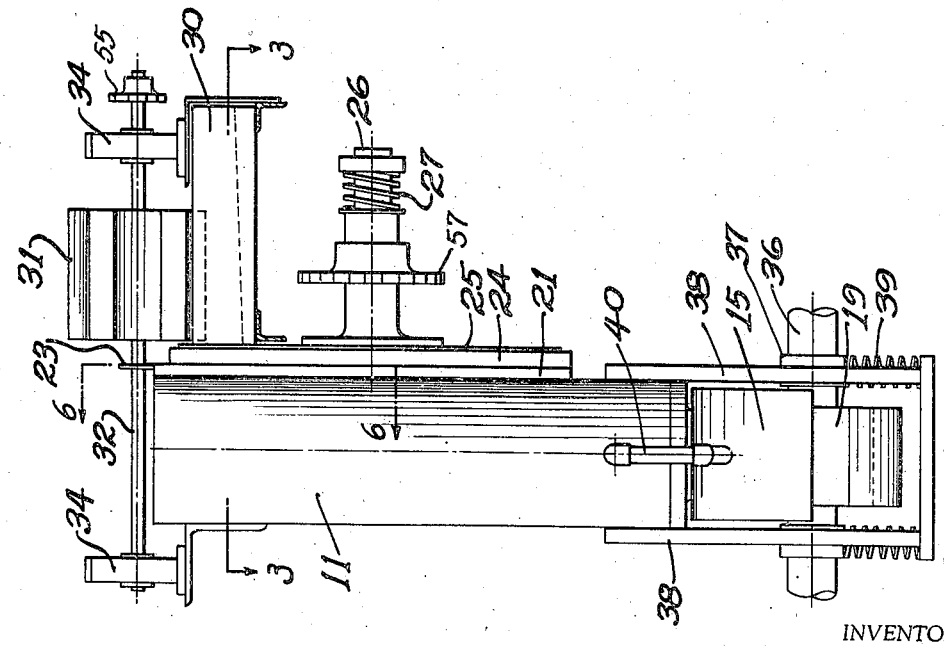
INVENTOR.
THOS. H. BRADLEY
BY
ATTORNEY.

July 26, 1949.  T. H. BRADLEY  2,477,168
FISH EVISCERATING APPARATUS
Filed March 12, 1945  3 Sheets-Sheet 2

INVENTOR.
THOS. H. BRADLEY
BY *Mellin, Aurich & Hanscom*
ATTORNEY.

July 26, 1949.    T. H. BRADLEY    2,477,168
FISH EVISCERATING APPARATUS
Filed March 12, 1945    3 Sheets-Sheet 3

INVENTOR.
THOS. H. BRADLEY
BY Mellin, Aurich & Hanscom
ATTORNEY.

Patented July 26, 1949

2,477,168

UNITED STATES PATENT OFFICE 2,477,168

FISH EVISCERATING APPARATUS

Thomas H. Bradley, Monterey, Calif.

Application March 12, 1945, Serial No. 582,251

3 Claims. (Cl. 17—3)

This invention relates to machines for eviscerating fish.

It is the principal object of my present invention to provide an improved and simplified automatic apparatus for rapidly, economically and efficiently eviscerating fish, in which apparatus the visceral cavity of the fish is subjected to an air evacuating action which effects the evisceration.

In practicing my invention, I provide an apparatus which includes a vacuum chamber having an eviscerating suction port. The apparatus also includes mechanism for conveying fish successively into register with that port in a continuous operation after such fish have been severed transversely to expose an end of the visceral cavity. A valve mechanism is provided which operates synchronously with the fish conveying means so that the said port of the vacuum chamber is automatically opened during the registry of the open end of the visceral cavity of the fish therewith so as to effect evisceration of the fish, and the delivery of the viscera into the vacuum chamber. The latter is provided with a discharge mechanism for automatically discharging the viscera therefrom without opening the vacuum chamber to the atmosphere.

One form which the invention may assume is exemplified in the following description and illustrated by way of example in the accompanying drawings, in which:

Fig. 1 is a view in side elevation of an apparatus embodying the preferred form of my invention.

Fig. 2 is a view in front elevation thereof.

Figure 5:
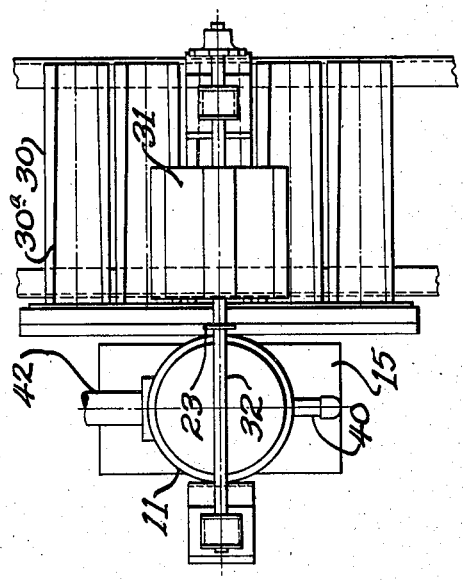
Fig. 5 is a plan view of the apparatus.
Figure 3:
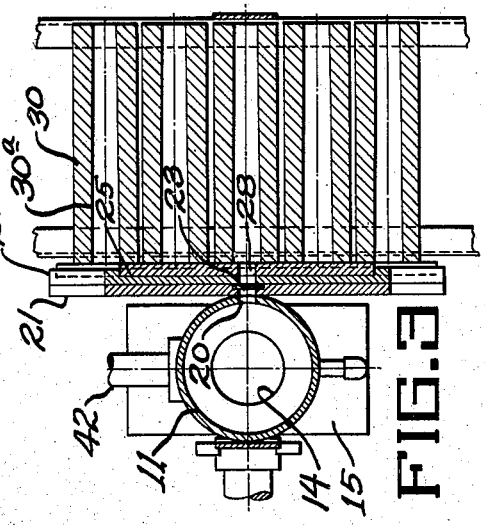
Fig. 3 is a plan section taken on line 3—3 of Fig. 1.
Figure 4:
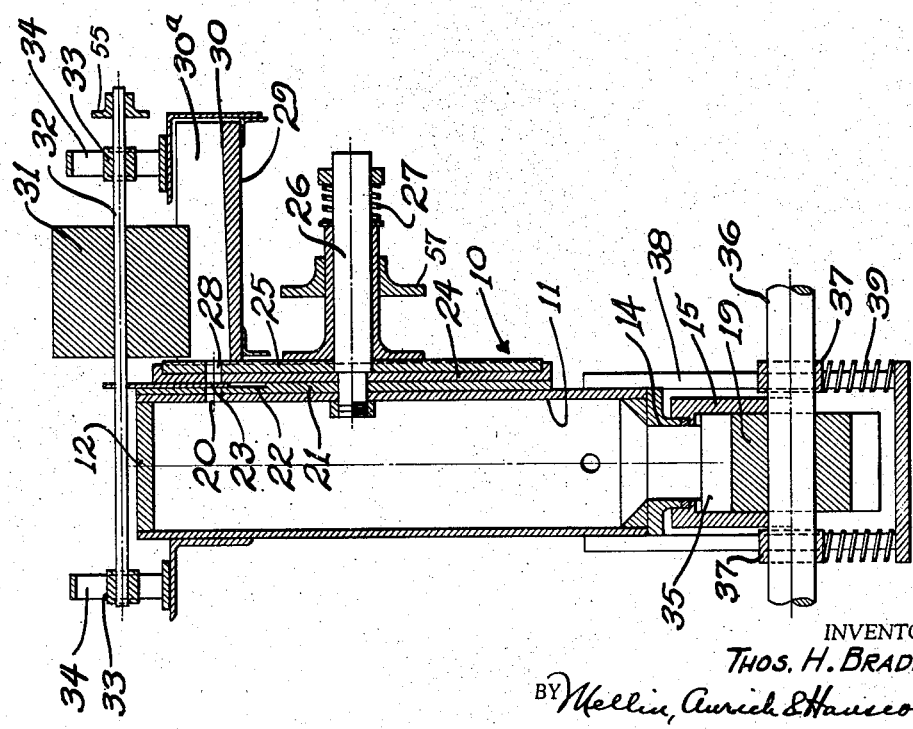
Fig. 4 is a vertical sectional view taken on line 4—4 of Fig. 2.

Referring more particularly to the accompanying drawings, 10 indicates a preferred form of apparatus for practicing my invention. This apparatus is utilized for eviscerating fish such as Monterey sardines and for this reason it must be and is capable of large production so that the evisceration may be economically accomplished.

The apparatus includes a vacuum chamber 11 in this instance shown as cylindrical and which has its upper end closed by a head member 12.

The lower end of the vacuum chamber 11 is formed with a discharge throat 14, the lower end of which is fitted with a semi-cylindrical discharge housing 15. As will be noticed from the drawings, this housing comprises a semi-cylindrical wall 16 enclosed at its ends by head members 17. The throat 14 of the vacuum chamber 11 projects into and is relatively fixed to the cylindrical wall 16, as illustrated, so that when the throat is open, any viscera contained in the vacuum chamber 11 may discharge downwardly through the throat 14 into the housing 15. The bore 18 of the housing 15 is concentric to an axis which is arranged at ninety degrees to the axial center of the vacuum chamber 11 and intersects the same, as illustrated. A rotatable discharge member 19 nests within the housing 15 and its outer periphery fits the bore 18 of that housing. The discharge member 19, in operation of the machine, continuously rotates and acts to receive and discharge viscera from the vacuum chamber 11 without opening the same to the atmosphere, as will be hereinafter more clearly described.

Adjacent its upper end the vacuum chamber 11 is formed with an eviscerating suction port 20. Fixed to the vacuum chamber 11 and overlying the port is a fixed slide valve seat plate 21 through which the port 20 extends. This slide valve seat plate 21 is provided with a slide valve seat 22 within which a vertically reciprocable slide valve 23 is mounted. Fixed to the slide valve seat plate 21 at the exterior side thereof is a fixed valve disc 24 through which the port 20 likewise extends. Nesting in the fixed valve disc 24 is a rotary valve disc 25 rotatably mounted on a fixed shaft 26, one end of which is secured to and supported in one wall of the vacuum chamber 11, as illustrated. Spring means 27 are provided which constantly urge the rotary valve disc 25 into firm contact with the face of the fixed valve disc 24.

The rotary valve disc 25 has a series of ports 28 formed therethrough which are arranged in a circle concentrically about the axis of rotation of the rotary valve disc 25. These valve ports 28 are spaced equal distances apart circumferentially, and as the rotary valve disc 25 rotates, the valve ports 28 successively register with the eviscerating intake port 20. It should be stated here that the rotary valve disc 25 is rotated continuously when the apparatus is in operation.

Disposed at one side of the apparatus is a fish conveyor 29 which travels continuously transversely of the apparatus in a horizontal plane. This conveyor is illustrated as of the endless chain type. However, it may be of the rotary type, if desired. Inasmuch as such fish conveyors are conventional and well known, only a portion of the upper flight thereof is here illustrated. It will suffice to say that it comprises endless chains or belts to which are fixed transversely arranged fish receiving blocks 30 spaced equal distances apart and formed with longitudinal sockets 30a for receiving a fish with the visceral cavity downmost. The fish are placed one to a block with the severed head end innermost with respect to the apparatus, which end is substantially flush with the inner end of the block in which it is placed.

Prior to being delivered to the present apparatus, the fish is severed transversely at the head to remove the head and expose the end of the visceral cavity. It is this severed end that substantially aligns with the inner end of the block in which the fish is placed. The cavity 30a in each block 30 is so formed that the exposed end of the visceral cavity of the fish will substantially register with the port 20 as the conveyor conveys the fish past this port.

It is intended that as each block registers with the intake port 20 of the vacuum chamber 11, that it will simultaneously register with a valve port 28 in the rotary valve disc 25. For this purpose the speed of operation of the conveyor 29 and the rotary valve disc 25 is closely synchronized. This is so that as the fish approaches the eviscerating intake port 20, it will register with a valve port 28 in the rotary valve disc 25, and when the port 28 registers with the eviscerating intake port 20, the suction will eviscerate the fish and draw the viscera through the port 20 and deposit it in the vacuum chamber 11. However, inasmuch as the conveyor and the disc 25 operate continuously and in synchronism, the port 20 will only be opened for intake during the time that the exposed end of the visceral cavity of the fish is in register therewith.

For the purpose of firmly holding the fish in position in the cavities 30a of the fish conveying blocks 30 during the eviscerating operation, I provide a hold-down wheel 31 secured on a shaft 32 mounted on the apparatus as shown. This shaft is horizontally disposed and extends at right angles to the conveyor 29 and overlies the apparatus. The shaft is fitted with bearing blocks 33 which are vertically reciprocable but non-rotatable in fixed cross-head guides 34. These guides are mounted in a fixed position on the apparatus. This mounting of the shaft 32 enables the shaft and the wheel 31 to move vertically with respect to the conveyor and the remainder of the apparatus.

It will be noticed that the longitudinally extending and radially projecting arms of the wheel 31 are so formed that they may project into the sockets of the blocks 30. The spacing of the arms of the wheel 31 and the speed that it is driven enables an arm thereof to register with the socket of each block 30 just before the latter reaches the evisceration station. The purpose of this is to enable the outer peripheral edges of the arm to engage a fish disposed in the socket 30a of the block 30 and hold the same firmly in position during the evisceration thereof.

The normal position of the shaft 32 and the wheel 31 is such that it will be disposed at a lower point than it will be disposed in the event that an arm thereon engages a fish in a socket 30a in one of the blocks 30. That is to say, in the event that there is a fish in the socket 30a, engagement of an arm of the wheel 31 therewith will cause the shaft 32 and the wheel 31 to elevate. In the event that there is no fish in the socket 30a which registers with an arm, the wheel 31 will lower. I utilize this action to operate the slide valve 23 which, as illustrated, is connected with the shaft 32. When the shaft 32 and the wheel 31 are in their lowermost position, the slide valve 23 will be lowered to a point where it will close the port 20. However, if the shaft 32 and the wheel 31 are elevated by engagement of a fish with one of the arms of the wheel 31, the slide valve 23 will be elevated (as illustrated in dotted lines) to uncover the port 20 of the vacuum chamber 11. This prevents a loss of vacuum in the chamber 11 which would result in the event that no fish is presented for evisceration at the eviscerating station.

Figure 7:
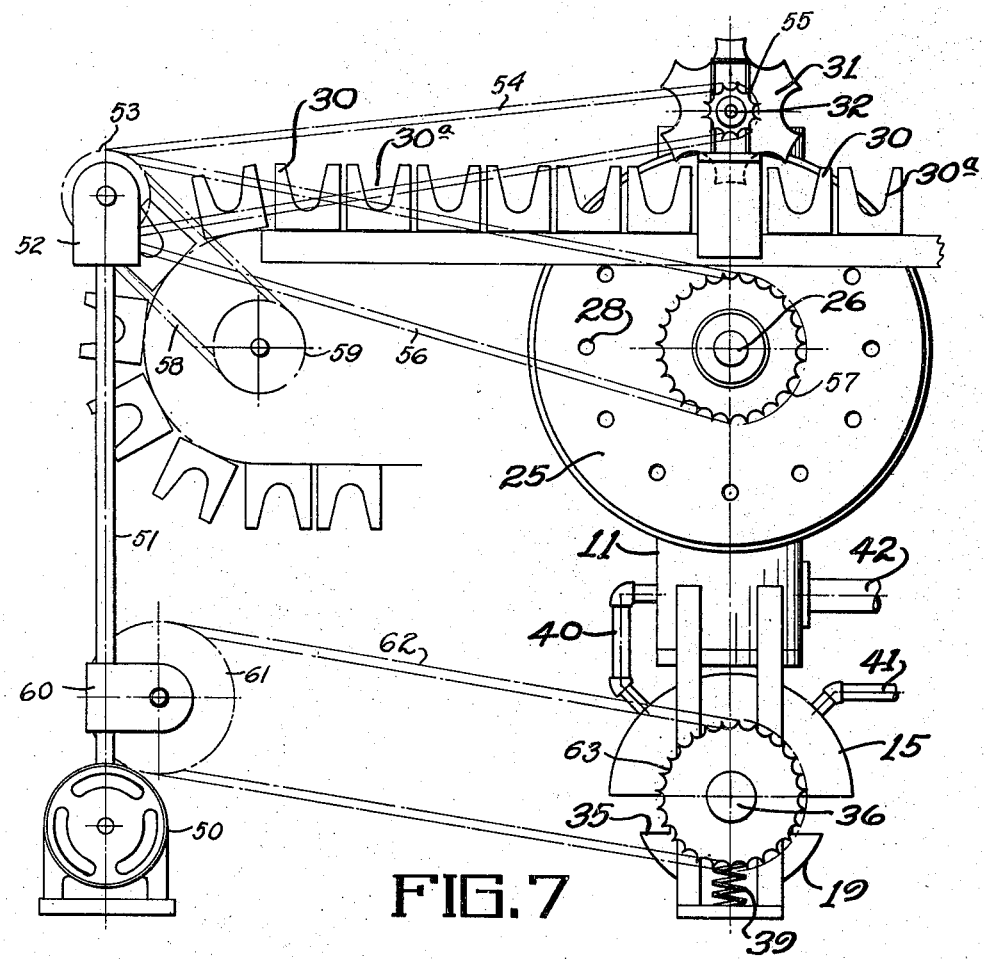
Fig. 7 is a diagrammatic view diagrammatically illustrating the drive of the various operating parts.
Figure 6:
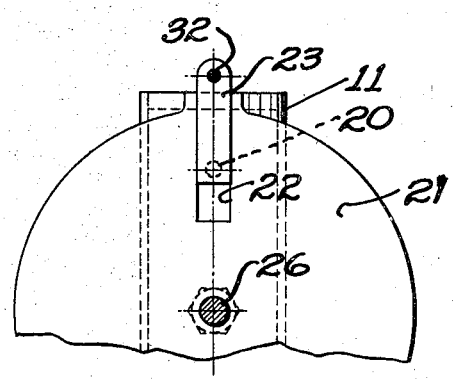
Fig. 6 is a fragmentary view in section taken on line 6—6 of Fig. 1.

In Fig. 7 I have illustrated diagrammatically the drive for synchronously driving the wheel 31, the conveyor 29 and the rotary valve disc 25. In that figure is also illustrated a drive for the rotary discharge member 19.

As before stated, when the evisceration has been completed, the viscera is deposited in the vacuum chamber 11 and descends into the throat 14 thereof. It is seen that the rotary discharge member 19 is formed with four longitudinal pockets 35 which successively register with the opening through the throat 14 of the vacuum chamber. The circumferential dimensions of these pockets 35 and their spacing relative to each other is such that at no time can there be communication between the atmosphere and the interior of the throat 14. Thus, as the discharge member 19 is continuously rotated, the pockets 35 successively register with the opening in the throat, receive viscera and discharge the same as the pocket emerges from the housing 15.

I prefer that the rotary discharge member 19 be fixed on a shaft 36 rotatably mounted in bearing blocks 37 vertically movable in fixed cross-head guides 38 formed as a part of the apparatus. Springs 39 constantly urge the bearing blocks 37 upwardly so as to at all times maintain a firm contact between the periphery of the member 19 and the bore 18 of the housing 15 and thereby prevent leakage therebetween. A by-pass conduit 40 is provided between the vacuum chamber and the bore 18 of the housing 15 so as to evacuate the pockets 35 just prior to the time that the same receive viscera from the vacuum chamber. I also provide a conduit 41 in communication with the bore 18 to provide a water seal for preventing leakage of air. A conduit 42 communicates with the interior of the vacuum chamber and may be connected to a vacuum pump to constantly evacuate the same.

In operation of my improved apparatus, it is constructed and assembled substantially as described and a drive is established to the wheel 31, the rotary valve disc 25 and the conveyor 29 so that the three operate in absolute synchronism. A drive is also established to the shaft 36 to operate the rotating discharge member 19. The driving of this member, however, does not have to be in any particular timed relation to the other driven elements. The fish are severed transversely and are disposed in the blocks 30 with the head end substantially registering with the inner ends of these blocks so that as the fish pass the port 20, the exposed end of the visceral cavity thereof will register therewith. Just prior to registration with the ports 20 a port 28 in the valve disc 25 will register with the exposed end of the visceral cavity and remain in such registration during the time that that exposed end of the visceral cavity passes into and out of registration with the port 20. During the latter registration the suction produced in the port 20 will eviscerate the fish, drawing the viscera through the port 20 and depositing into the vacuum chamber 11.

The apparatus is operated and synchronization of the various elements thereof is provided in the following manner: Power is provided by means of a motor 50 which is suitably geared by means not shown to a vertical shaft 51. The hold-down wheel 31 is rotated off of the shaft 51 through the medium of a gear reduction unit 52, a sprocket assembly 53, a chain 54, and a sprocket 55 secured to the shaft 32. The rotary disc valve 25 is driven off of the sprocket assembly 53 by means of a chain 56 and a sprocket 57 secured to the shaft 26. The conveyor blocks 30 are moved by the sprocket assembly 53, a chain 58 and a sprocket 59. The discharge member 19 is driven by means of a gear reduction unit 60, a sprocket 61, a chain 62 and a sprocket 63 secured to the shaft 36.

I also desire to point out that prior to the time that the fish reaches the evisceration station, the fish therein will be engaged by one of the arms on the wheel 31 and the latter will be elevated with its shaft 32 sufficiently to render the slide valve 23 ineffective to close the port 20. However, in the event that there is no fish in a socket, the wheel 31 and its shaft 32 will remain in lowered position, in which position the slide valve 23 will cover the port 20 and prevent the opening thereof.

As the viscera deposits into the vacuum chamber 11, it will drop into a pocket 35 of the discharge member 19 and will be removed and discharged from the apparatus by said member 19 without at any time opening the interior of the vacuum chamber 11 to the atmosphere.

From the foregoing it is obvious that I have provided a comparatively simple machine for effecting evisceration of fish, both rapidly and economically, in an operation that is entirely automatic.

While I have shown the preferred form of my invention, it is to be understood that various changes may be made in its construction by those skilled in the art without departing from the spirit of the invention as defined in the appended claims.

Having thus described my invention, what I claim and desire to secure by Letters Patent is:

1. Apparatus of the character described comprising a vessel adapted to hold a vacuum and having a suction port, a continuous fish conveyor having uniformly spaced fish holding means and so disposed as to convey fish to and past a suction station in alignment with said suction port, a rotatable disc valve disposed between said suction station and suction port and having a plurality of uniformly and circumferentially spaced valve ports so disposed as to register with said suction port, means for moving said conveyor, means for rotating said disc valve and means for synchronizing said moving and rotating means so as to register a valve port with said suction port when a fish is at said suction station.

2. Apparatus of the character described comprising a vessel adapted to hold a vacuum and having a suction port, a continuous fish conveyor having uniformly spaced fish holding means and so disposed as to convey fish to and past a suction station in alignment with said suction port, a rotatable disc valve disposed between said suction station and suction port and having a plurality of uniformly and circumferentially spaced valve ports so disposed as to register with said suction port, a slide valve and a rotatable hold-down wheel supported for movement in unison to and from a position wherein said slide valve closes said suction port, said hold-down wheel having radially projecting arms and being so disposed as to be actuated by fish conveyed on said conveyor and to open said slide valve when a fish is at said suction station, means for moving said conveyor, means for rotating said disc valve, means for rotating said hold-down wheel and means for synchronizing said moving and rotating means so as to register a valve port with said suction port when a fish is at said suction station.

3. Apparatus of the character described comprising a vessel adapted to hold a vacuum and having a suction port, a continuous fish conveyor having uniformly spaced fish holding means and so disposed as to convey fish to and past a suction station in alignment with said suction port, a rotatable disc valve disposed between said suction station and suction port and having a plurality of uniformly and circumferentially spaced valve ports so disposed as to register with said suction port, a slide valve and a rotatable hold-down wheel supported for movement in unison to and from a position wherein said slide valve closes said suction port, said hold-down wheel having radially projecting arms and being so disposed as to be actuated by fish conveyed on said conveyor and to open said valve when a fish is at said suction station, means for moving said conveyor, means for rotating said disc valve, means for rotating said hold-down wheel and means for synchronizing said moving and rotating means so as to register a valve port with said suction port when a fish is at said suction station, a housing integral with the bottom of said vessel, a pocketed rotary discharge valve in air-tight engagement with said housing, and a by-pass conduit extending from said vessel to said housing whereby each pocket in said discharge valve is evacuated just prior to receiving viscera from said vessel.

THOMAS H. BRADLEY.

REFERENCES CITED

The following references are of record in the file of this patent:

UNITED STATES PATENTS

| Number | Name | Date |
|---|---|---|
| 1,134,529 | Hauber | Apr. 6, 1915 |
| 1,628,968 | Gray | May 17, 1927 |
| 1,689,670 | Gray | Oct. 30, 1928 |
| 2,326,146 | Kurzbin | Aug. 10, 1943 |